Oct. 23, 1934.	W. M. TUTTLE	1,977,868
PROCESS OF MAKING BRICKS
Filed Aug. 11, 1931
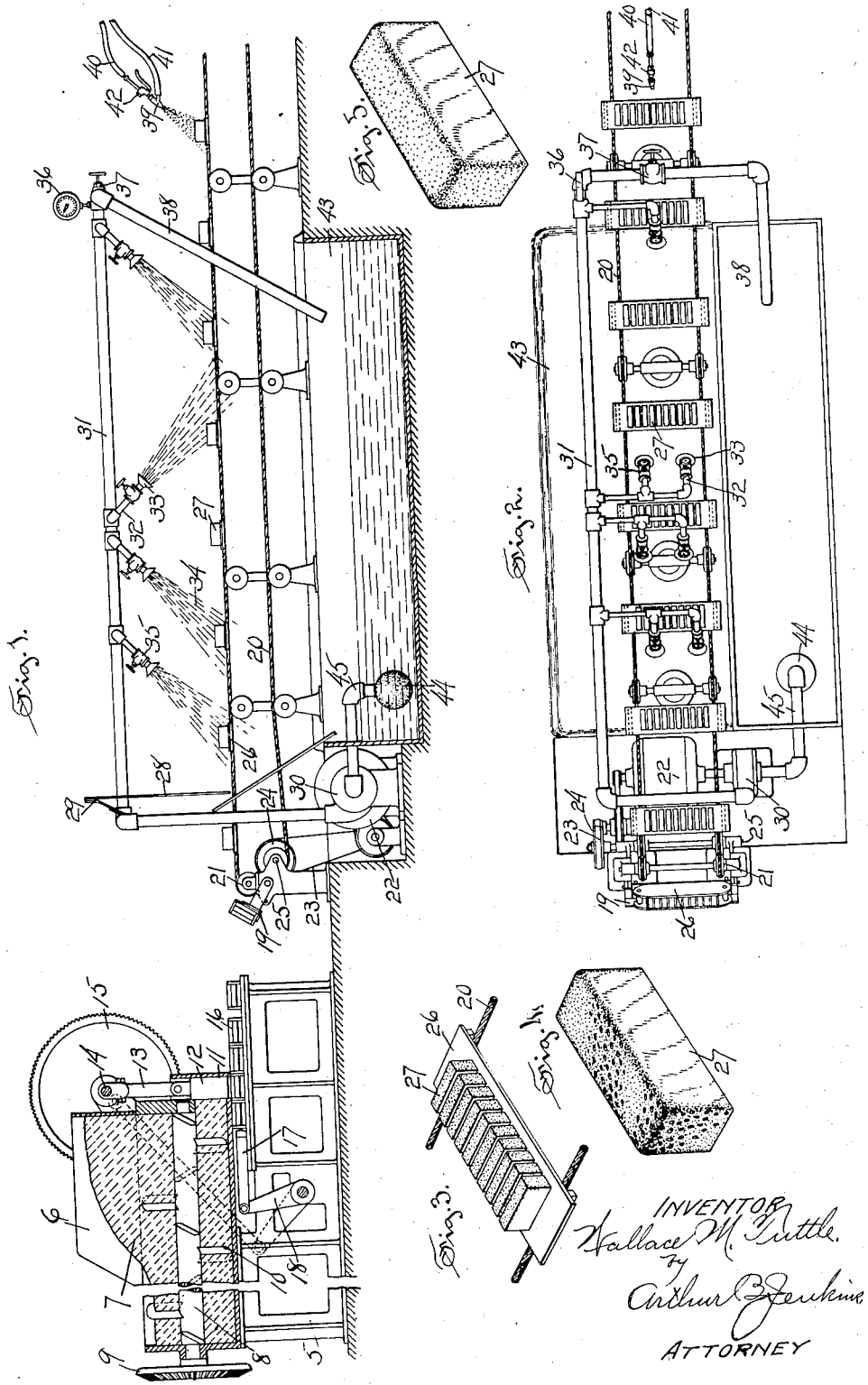

Patented Oct. 23, 1934

1,977,868

UNITED STATES PATENT OFFICE 1,977,868

PROCESS OF MAKING BRICKS

Wallace M. Tuttle, Middletown, Conn.

Application August 11, 1931, Serial No. 556,389

1 Claim. (Cl. 25—156)

My invention relates to the process and machine for forming bricks commonly used in building construction, and an object of my invention, among others, is the production of bricks in a cheap and effective manner to imitate old bricks used in building construction many years ago by means of crude processes.

A machine embodying my invention and in the making and use of which the objects herein set out, as well as others, may be effected, is illustrated in the accompanying drawing, in which—

Figure 1 is a view in side elevation of my improved brick making machine with parts broken away to show construction.

Figure 2 is a plan view of the same.

Figure 3 illustrates the arrangement of the bricks on a pallet just after they are delivered from the brick forming section of the machine.

Figure 4 is an isometric view of one form of a brick produced by the use of my improved machine.

Figure 5 is a similar view of another brick produced by the use of my improved machine.

In accord with the custom at the present time of making use of antique devices it is very popular to use in building construction bricks actually produced by old and crude processes, or, at least, bricks in imitation of those thus produced.

In the production of brick by these old and crude methods the bricks were formed or moulded from clay of a somewhat soft consistency and these bricks, for drying purposes, were placed on boards deposited on the ground in unsheltered positions exposed to the action of the elements. In the event of a rainstorm the bricks were more or less affected by the action of the rain thereon. If the rain was light the surfaces exposed to the weather would be pitted to a slight degree and made more or less rough, producing what was known as a rain washed brick. If the rain was heavy this condition would be exaggerated and in addition the exposed corners of the bricks would be more or less washed away or destroyed the result in either instance being the production of what was then known as a rain washed brick.

In the practice of some of the old methods the molds in which the bricks were formed were first dipped in water to prevent the blocks from sticking in the molds and to enable the latter to be readily removed in preparation for the drying operation. Bricks produced by this method consist of bare clay devoid of sand or other finish as distinguished from the sand struck processes in which the molds were dipped in sand just before being filled with the clay and a coating of sand was thereby applied to the bricks producing the so-called sand struck bricks.

However, whether sand struck or water struck bricks were produced they were dried in the open with the possible results hereinbefore described, and it is a purpose of the present invention to reproduce bricks in imitation of those produced by such old methods.

These effects may be obtained in the use of the machine illustrated and described herein, and embodying my invention, such machine comprising a base frame 5 of any suitable form and construction and supporting thereon a receptacle 6 for clay in a mass 7 of a more or less soft consistency. A feed shaft 8 is mounted in the receptacle and is driven as by means of a gear 9 secured to the shaft and which may be meshed with another gear driven from any suitable source of power, not shown herein. The shaft is provided with feed blades 10 for stirring the clay and for forcing it toward and into a chamber 11 in which it is acted upon by a plunger 12 mounted for reciprocating movement as by means of a connecting rod 13 pivotally attached to a crank shaft 14 driven as by means of a gear 15 connected up to the driving mechanism of the machine in any suitable manner.

The plunger 12 presses the clay into moulds 16 that are usually placed upon a table on the frame 5 and are moved, after being filled, from underneath the plunger, as by means of a pusher 17, actuated by a pusher arm 18 connected in any suitable manner with the driving mechanism of the machine, as herein shown this connection being with the crankshaft 14.

All of the mechanism thus far described is of old and well known construction and will be readily understood by those skilled in the art, and for this reason a further and detailed description is omitted herein. From the table just mentioned the moulds are placed edgewise upon a pallet 26 upon a rest 19 and are then lifted off from the brick forms which are retained on the pallet on the rest that is rocked in any suitable manner to place such pallets upon an endless conveyor comprising, as herein shown, endless cables 20 disposed in any suitable and common manner upon sheaves or pulleys 21. The conveyor may be connected up and driven in any suitable manner as from a motor 22, as herein shown a belt 23 extending from a pulley belted to the motor shaft to a pulley 24 mounted on a shaft 25 of one of the sheaves 21. The rest 19 may be rocked in any suitable manner, manually or otherwise, to place the brick forms upon pallets 26 deposited on the cables 20, the bricks 27 being placed side by side upon the pallets and with suitable spaces between them so that all but one edge of the bricks are exposed to the action of elements to be hereinafter described.

After the bricks are deposited on the pallets, and the moulds are removed therefrom, as shown in Fig. 1, the conveyor passes the pallets with the bricks thereon past an apron or shield 28 depending from a support 29 attached to a frame comprising pipes extending from a pump 30 by means of which water is delivered to a distributing pipe 31 extending horizontally along the machine above the conveyor.

Sprayer tubes 32 extend from the pipe 31 preferably in an inclined position with respect to the direction of movement of the conveyor, these tubes having spraying nozzles 33 by means of which showers 34 of liquid may be directed in a diagonal direction onto the bricks on the pallets as they are carried through such showers. The nozzles are provided with valves 35 by means of which sprays may be controlled. An indicator 36 is mounted on the pipe 31 and communicates with the passage therein, such indicator serving to denote the amount of pressure in said pipe, it being here remarked that different pressures will be required to produce different results as to the appearance of the bricks after having been acted upon by the sprays, as hereinbefore described. In order to vary this pressure a valve 37 is located in the outlet or delivery pipe 38, and by opening or closing such valve the pressure in the pipe 31 may be varied at will.

After passing the region of the sprays the bricks may be subjected to the action of a stream of material, as fine sand, or coarser matter, these being delivered as from a nozzle 39 acting on the injector principle and having connected therewith two tubes 40—41, one extending from a source of supply for the material and the other extending from a source of pressure of air or other fluid, the former tube having a valve 42 as a means for controlling delivery from the nozzle.

A tank 43 is located underneath the conveyor, and the delivery pipe 38 extends to deliver excess fluid into said tank, and the excess fluid sprayed onto the bricks will also fall into said tank. The pump 30 may be connected with said tank to take its supply therefrom, as well as from other sources, and a strainer 44 on an inlet 45 of the pump keeps sand and other dirt from entering the pump.

In operation of the device the trays containing brick of a comparatively soft plastic clay are placed on the conveyor and are carried thereby through the showers 34. The pressure in the pipe 31 is regulated to vary the force of the showers. If an imitation of a "rain-struck" brick is desired the pressure is comparatively light so that the action of the spray upon the soft brick will be mild. If an imitation of a "rain-washed" brick is desired then the pressure will be increased, and the action of the sprays will be more severe, and the corners of the bricks will be more or less washed off or rounded. This readily permits a "run" of any desired number of bricks to be produced of an imitation of a certain effect. After passing the sprays the bricks may be subjected to the action of the nozzle 39 whereby a fine sand may be sprinkled onto the brick of any color that may be desired, thereby imparting a surface of a particular appearance.

In many cases it is desired that the bricks shall have a pitted appearance as shown in Fig. 4, and for this purpose the material ejected from the nozzle 39 may be comparatively coarse, and the bricks just having been moistened by the sprays this coarse material will penetrate the brick so that it will be buried therein to any extent, preferably just underneath the surface so that such material will show at the surface.

I claim—

That process for making bricks that consists in forming the bricks from clay of a consistency merely to retain their shapes, then depositing the bricks in spaced apart relation on a tray, then subjecting said bricks to a shower of liquid directed in a diagonal direction on one side and one end of said bricks, and then drying said bricks.

WALLACE M. TUTTLE.